US008601982B2

(12) United States Patent
Shimizu

(10) Patent No.: US 8,601,982 B2
(45) Date of Patent: Dec. 10, 2013

(54) PET ENVIRONMENT

(76) Inventor: Jerome Shimizu, Jersey City, NJ (US)

(*) Notice: Subject to any disclaimer, the term of this patent is extended or adjusted under 35 U.S.C. 154(b) by 109 days.

(21) Appl. No.: 12/953,888

(22) Filed: Nov. 24, 2010

(65) Prior Publication Data

US 2011/0126774 A1    Jun. 2, 2011

Related U.S. Application Data

(60) Provisional application No. 61/264,716, filed on Nov. 27, 2009.

(51) Int. Cl.
*A01K 1/01* (2006.01)

(52) U.S. Cl.
USPC .......................................... 119/479; 119/161

(58) Field of Classification Search
USPC ................. 119/161–163, 462, 463, 479, 482
See application file for complete search history.

(56) References Cited

U.S. PATENT DOCUMENTS

| | | | | |
|---|---|---|---|---|
| 491,421 | A * | 2/1893 | Gersdorff | 141/297 |
| 1,468,730 | A * | 9/1923 | Oster | 119/462 |
| 2,469,784 | A * | 5/1949 | Quinn | 119/161 |
| 3,177,848 | A | 4/1965 | Rubricius | |
| 3,990,397 | A | 11/1976 | Lowe | |
| 4,572,107 | A * | 2/1986 | Clarizo | 119/463 |
| 5,394,835 | A | 3/1995 | Gatta | |
| 5,551,375 | A | 9/1996 | Flores | |
| 5,765,505 | A * | 6/1998 | Yun | 119/432 |
| 5,803,016 | A * | 9/1998 | Poulson | 119/161 |
| 5,924,380 | A * | 7/1999 | Rayborn | 119/51.5 |
| 6,453,844 | B1 | 9/2002 | Janzen et al. | |
| 6,463,881 | B1 * | 10/2002 | Reitz | 119/163 |
| 6,626,129 | B2 * | 9/2003 | Schrader | 119/479 |
| 6,739,363 | B2 * | 5/2004 | Walter et al. | 141/331 |
| 7,584,717 | B2 * | 9/2009 | Skovron et al. | 119/165 |
| D641,455 | S * | 7/2011 | Euse | D23/284 |
| 2007/0012257 | A1 * | 1/2007 | Siegal et al. | 119/479 |

FOREIGN PATENT DOCUMENTS

FR          2623971 A1    6/1989

* cited by examiner

*Primary Examiner* — Rob Swiatek
*Assistant Examiner* — Justin Benedik
(74) *Attorney, Agent, or Firm* — Hahn, Loeser & Parks LLP; Rex W. Miller, II

(57) ABSTRACT

A pet environment is disclosed that may have a platform having an outer edge and a platform aperture, the platform sloping downward from adjacent the outer edge to the platform aperture; a housing structure positioned above the platform aperture having at least one pathway in the housing structure, the pathway having at least one opening adapted to receive pet waste; and a gap between the platform and the housing structure extending along at least a portion of the platform aperture to receive pet waste from the platform. The pet environment may also have a container for collecting pet waste positioned below the aperture, and a support structure beneath the platform adapted to support the platform and the housing structure. The support structure may be flexible and may produce a vibratory effect in response to movement of an animal.

18 Claims, 10 Drawing Sheets

PET ENVIRONMENT

CROSS-REFERENCE TO RELATED APPLICATION

This application claims priority to and the benefit of U.S. Provisional Patent Application 61/264,716, filed Nov. 27, 2009, the disclosure of which is incorporated herein by reference.

BACKGROUND

The present disclosure is related to a pet environment, and more specifically, to a pet environment for animals such as guinea pigs, rabbits, hamsters, gerbils, mice, and other small animals.

Small animals kept as pets, including guinea pigs, rabbits, hamsters, gerbils, and mice, are commonly housed in cages. Cages traditionally are rectangular structures with a floor, walls, and often a closed top. Cages have been produced from metal and plastic, as well as other materials. The traditional cages are typically small with limited usable space or living area for the animals. Also, traditional cages have limited ability to expand the usable space if more animals are desired. The use of walls and a closed structure has substantially isolated small animal pets from their surroundings reducing interaction between the pets and their human caretakers.

Small animals, such as guinea pigs for example, are generally social animals and benefit from interaction with each other and with their human caregivers. Traditional pet cages being closed and confining discourage such interaction between the animals and people because additional effort is required to open the cage and remove the animal. Further, many pet cages are not designed to be aesthetically pleasing and thus are not easily incorporated into the living areas of a home. As such, pets are frequently relegated to seldom used rooms with reduced opportunities for interaction.

Traditional pet cages have also generally required the use of bedding material. Bedding materials such as wood chips, straw, litter, or other similar materials have served several purposes. For example, some animals, such as guinea pigs, have small delicate feet that are not well suited for standing or walking on a wire mesh floor. For cages having a wire mesh floor, some form of bedding has been required to create a protective layer to guard against injury to the animal.

Bedding has also been required to absorb pet waste, including urine and feces. In a typical pet cage, the pet's living area is also the area in which pet waste accumulates. Bedding has been used to absorb some of the waste generated by the animals. Typically, pet waste is permitted to accumulate for a period of time until the bedding material and pet waste are removed from the cage. New bedding material is then added to the cage and the cycle repeated. The replacement bedding material has been a recurring cost adding to the total cost of caring for small pets.

Particularly for cages of the wire mesh design, pet owners have also had to clean bedding material kicked or spilled from the cage. Pets moving about within the cage often kick bedding material causing the bedding material to leave the cage. Bedding material may also be spilled during the removal of soiled bedding material and the replacement of clean bedding material. This spilling of bedding material adds to the demands upon small pet owners. Further, special care must be taken in the selection of bedding material as some types of bedding material may contain chemicals harmful to pet or humans. For example, many animals are highly sensitive to scents and therefore even mildly scented bedding may be uncomfortable or even harmful to the animals.

Prior cage designs have typically combined the pet's living area and the area in which pet waste is deposited and collected. As a result, many small animals effectively live in a litter box, eating, drinking, and playing in the same environment in which waste accumulates between cleanings. The collocation of the pets with the pet waste has lead to unhealthy conditions for some animals. Further, the greater the number of animals in a single cage, the faster waste accumulates increasing the cleaning required and the potential for unhealthy conditions to develop.

There continues to be a need for a pet housing environment that promotes interaction between the pet and human caregivers and reduces the costs of caring for the animals. Also desired is a pet housing environment that provides a more hygienic living environment for the pet.

SUMMARY

A pet environment is presently disclosed. The pet environment may have a platform having an outer edge and a platform aperture adapted to receive pet waste, the platform sloping downward from adjacent the outer edge to the platform aperture; a housing structure positioned with the platform aperture having at least one pathway in the housing structure, and the pathway having at least one opening adapted to receive pet waste. The pet environment may have a gap between the platform and the housing structure extending along at least a portion of the platform aperture to receive pet waste from the platform. The pet environment may also have a container for collecting pet waste positioned below the aperture.

The platform may be substantially concave and may be formed in various shapes including substantially rectangular, substantially circular, trapezoidal, triangular, and other suitable shapes. The platform may be formed from plastic, wood, metal, or other suitable materials. The platform may be textured and may be coated or painted.

The pet environment may have a frame adapted to support the housing structure above the platform aperture. The pathway in the housing structure and the frame may be formed as a unitary component. The housing structure may have a removable cover and may be adapted to be positioned over the at least one pathway. The housing structure may be further adapted to support a food dispenser, a water dispenser, or both. The pathway in the housing structure may be sloped to improve the transfer of pet waste to the at least one opening, and the pathway may be adapted to support a resting animal. The pathway may comprise a tubular section extending through the housing structure.

The pet environment may also include a support structure beneath the platform adapted to support the platform and the housing structure. In one example, the support structure may be flexible and adapted to produce a vibratory effect in response to movement of an animal. In another example, the support structure may be adapted to support a container for collecting pet waste positioned below the aperture.

Also the pet environment may have a substantially concave platform with an outer edge and a platform aperture adapted to receive pet waste from the platform, where the platform slopes downward from adjacent the outer edge towards the platform aperture. The pet environment also has a housing structure above the platform aperture. The housing structure has at least one tubular section. The tubular section has at least one opening adapted to receive pet waste, and is sloped to improve transfer of pet waste to the at least one opening. The housing structure also has a removable cover adapted to be positioned over the at least one tubular section, and a frame adapted to support the housing structure above the platform aperture. The pet environment also may have a gap between the platform and the housing structure extending along at least a portion of the platform aperture to receive pet waste from the platform, a container positioned below the platform aperture adapted to receive pet waste, and a support structure beneath the platform adapted to support the platform and the housing structure, where the support structure is flexible and adapted to produce a vibratory effect in response to movement of an animal.

DETAILED DESCRIPTION OF THE DRAWINGS

Referring generally to FIGS. 1-11, a pet environment is disclosed. The pet environment 100 may be adapted to house one or more pets, such as guinea pigs, rabbits, hamsters, gerbils, mice, or other animals. The pet environment 100 may improve the collection and disposal of pet waste and provide a more hygienic living environment for a pet.

Figure 1:
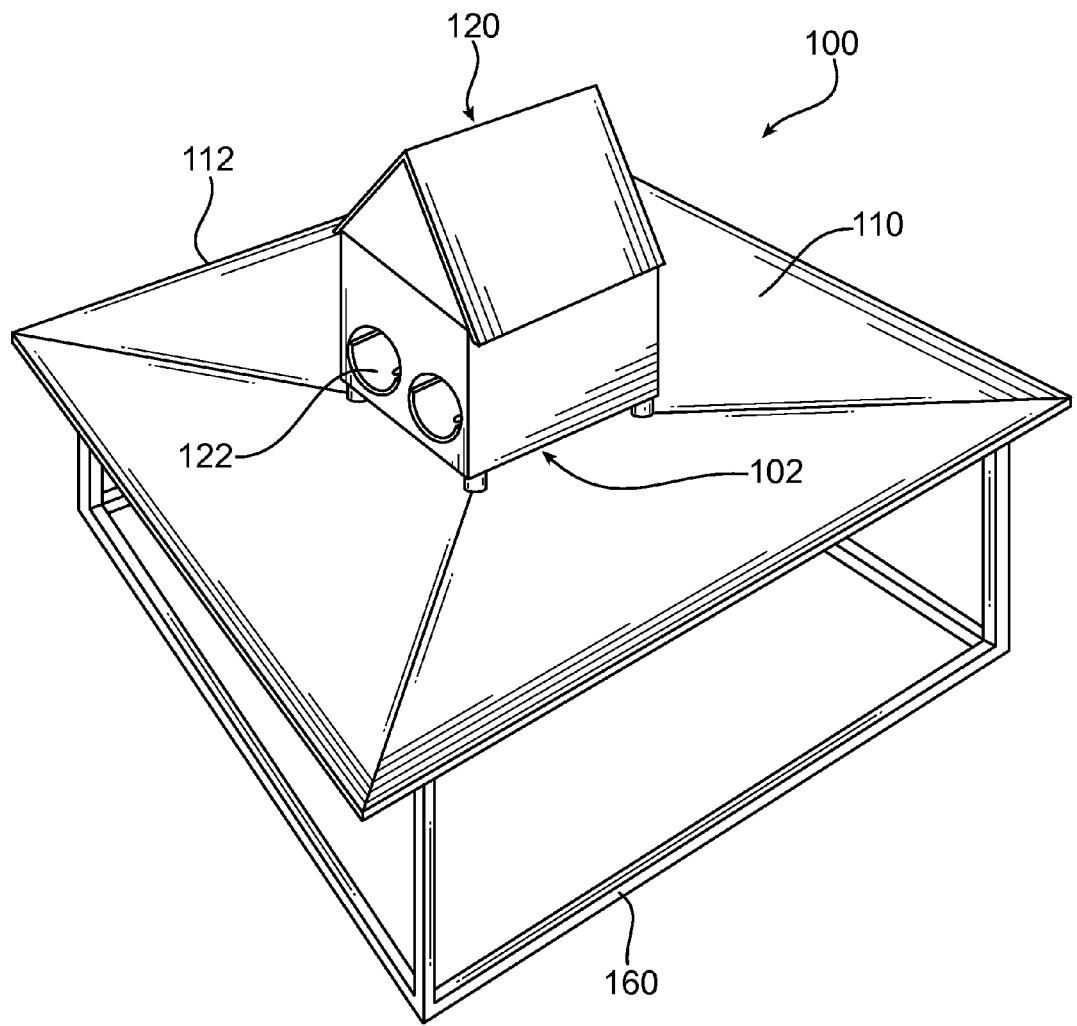
FIG. 1 is a perspective view of a pet environment.

As shown in FIG. 1, the pet environment 100 may include a platform 110 having an outer edge 112 and a platform aperture 118 (not shown in FIG. 1) adapted to receive pet waste. The platform 110 may slope downward from adjacent the outer edge 112 to the platform aperture 118. The platform aperture 118 may be centrally located on the platform 110 as shown, but may be positioned in any portion of the platform 110 including a corner of the platform 110. The pet environment 100 may also have a housing structure 120 positioned with the platform aperture 118 having at least one pathway 122 in the housing structure. As illustrated, the housing structure 120 may be positioned above the platform aperture 118. Alternatively, the housing structure 120 may be positioned within the platform aperture 118, or substantially over the platform 110. The at least one pathway 122 may have at least one opening 124 adapted to receive pet waste. The pet environment 100 may also have a gap 102 between the platform 110 and the housing structure 120 extending along at least a portion of the platform aperture 118 to receive pet waste from the platform 110. The pet environment 100 may also have a container 156 for collecting pet waste positioned below the platform aperture 118.

The pet environment 100 may support and house a pet. Taken together the platform 110 and the housing structure 120 may comprise a living area for one or more pets in the pet environment 100. The size of the pet environment 100 and of its components may be selected depending upon the type and number of pets the pet environment is to house. For example, for one guinea pig a usable area of approximately 9 square feet may be desired. For two guinea pigs, a usable area of approximately 11 square feet may be desired. Generally, larger pets may require greater usable area to adequately exercise, and larger numbers of pets may require greater usable area.

As shown in FIG. 1, the housing structure 120 may sit atop the platform 110. In other examples, the housing structure 110 may be positioned within the platform aperture 118, or may extend into or below the platform aperture 118. The housing structure 120 may have two pathways 122 as illustrated. The pathways 122 may be open on both ends and serve as a path through the housing structure. Alternatively, the pathways 122 may be open only on one end. In yet other alternatives, the pathway 122 may form a curve, U-shape, angle or other suitable shapes within the housing structure. The pathways 122 may also be serve as a resting area for the pets. Many pets prefer a semi-closed or secluded structure for sleeping and the housing structure 120 may substantially surround the pathway 122. In another alternative, the housing structure 120 may be substantially open. The size and shape of the housing structure 120 and the pathways 122 may be selected for the type of pet or pets. In one example, the housing structure may be integrally formed with the pathways and may be substantially open.

The platform aperture 118 may be adapted to receive pet waste. When a pet deposits waste, such as feces or urine, on the top surface 116 of the platform 110, the downward slope of the platform 110 may be sufficient to cause the pet waste to roll or run towards the platform aperture 118. The pet waste may then pass through the platform aperture 118. Additionally, when a pet deposits waste in the pathways 122 of the housing structure 120, the pet waste may pass through the pathway opening 124. The pet waste passing through the pathway opening 124 may fall through the platform aperture 118. Alternatively, the pet waste passing through the pathway opening 124 may fall onto the platform 110 and proceed towards the platform aperture 118 as described above. In this manner, the pet waste may be separated from the pet in the pet environment providing a more hygienic living environment than with previous pet cages.

Referring now to FIGS. 2 through 4, several examples of a platform 110 are illustrated. The platform 100 may slope downward from adjacent the outer edge 112 to the platform aperture 118. The platform aperture 118 may be an opening or hole in the platform adapted to receive pet waste. In another alternative, the platform aperture 118 may be two or more openings, holes, or apertures in the platform 110. In yet another example, the platform aperture 118 may be provided with a grate having openings sized to allow pet waste to pass through the grate. In general terms, the platform aperture 118 may encompass any structure or opening adapted to permit pet waste to pass from the platform 110 through the platform aperture 118 into a container or other collection structure. The platform 110 may be described as substantially concave, however, no specific shape or slope is required. The degree of the downward slope of the platform 110 may be constant between adjacent the outer edge 112 and the platform aperture 118. In one example the platform 110 may have a downward slope of approximately 5°. In other examples, the platform may have a downward slope of between 2° and 5°, or between 5° and 10°. Alternatively, the degree of downward slope may vary between the platform aperture and adjacent the outer edge 112. The downward slope may be selected to provide a comfortable surface upon which the pet may move. As such, the desired slope may be related to the type of animal intended for use the pet environment 100. The downward slope may extend to the outer edge 112 or may extend to near the outer edge 112. A small section of substantially flat or non-sloping platform may be included near the outer edge forming a rim or perimeter at least partially around the platform 110.

Figure 2A:
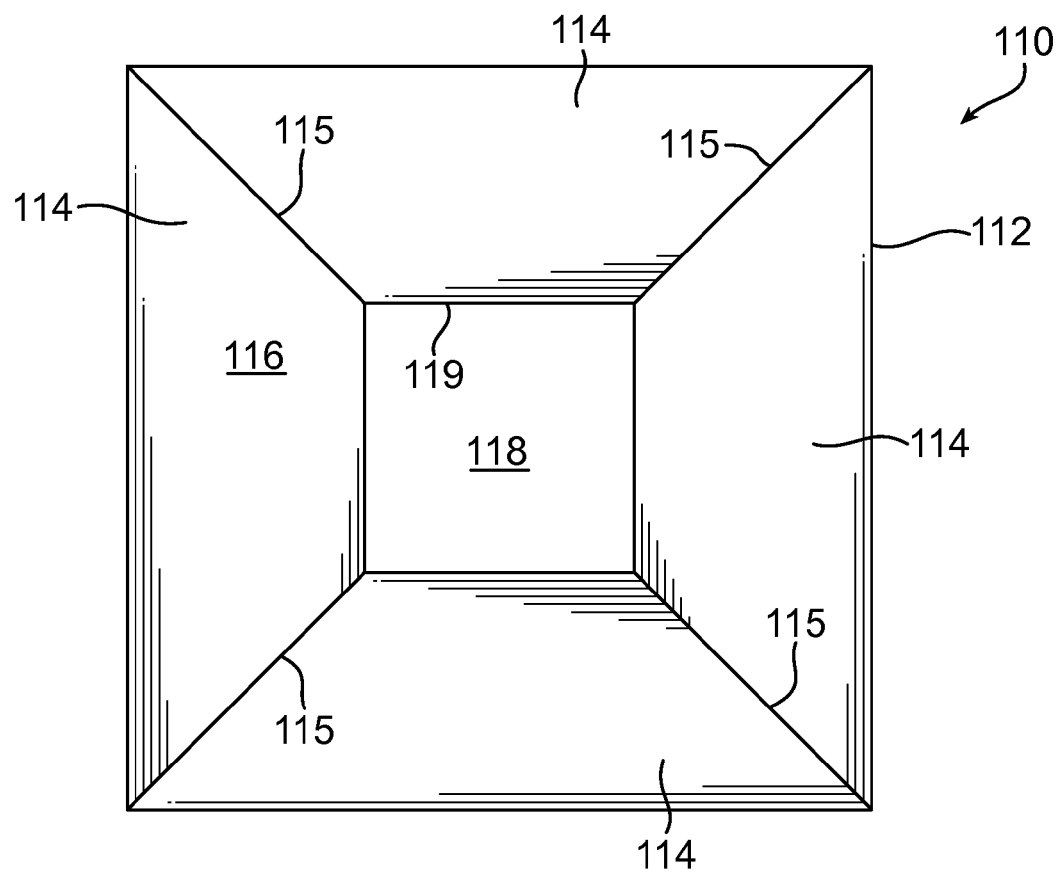
FIGS. 2A-B are views of a platform for use with a pet environment.
Figure 2B:
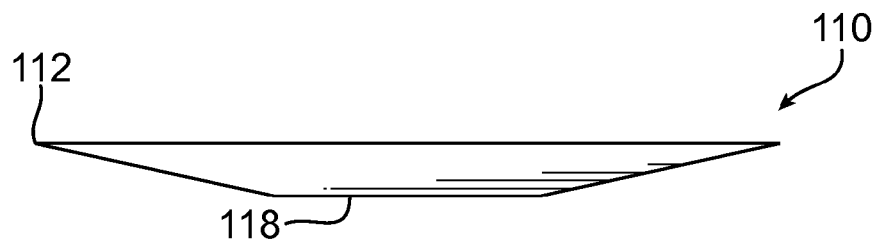

The platform 110 may be generally rectangular, and the platform aperture 118 may be generally rectangular as illustrated in FIGS. 2A and 2B. In one example, the area of the platform aperture 118 may be approximately 10% or less of the total area of the platform 110. In other configurations, the area of the platform aperture 118 may be approximately 5%, 3%, or 1% of the total area of the platform 110. As shown in FIG. 2A, the platform 110 may be formed from four trapezoid shaped pieces 114 joined together at seams 115. The seams 115 may be sealed to prevent leakage through the platform 110. The platform 110 may be formed from metal, plastic, wood, or any suitable material for supporting the housing structure 120 and the pets in the pet environment 100. In another example, the platform 110 may be formed from molded plastic thereby eliminating seams between the sections. The platform 110 may be rigid or may be sufficiently flexible to resiliently deform in response to movement of an animal across the platform. The deformation or movement of the platform may produce a vibratory effect facilitating the transfer of pet waste from the platform 110 to the platform aperture 118.

As shown in FIG. 2B, the platform 110 may have a constant downward slope from adjacent the outer edge 112 to the platform aperture 118 adapted to receive pet waste. The platform aperture 118 may be adapted to improve the passage of waste from the top surface 116 of the platform 110 through the platform aperture 118. For example, the inner edge 119 of the platform aperture may be curved downward or rolled such that pet waste more freely falls from the platform 110.

Figure 3A:
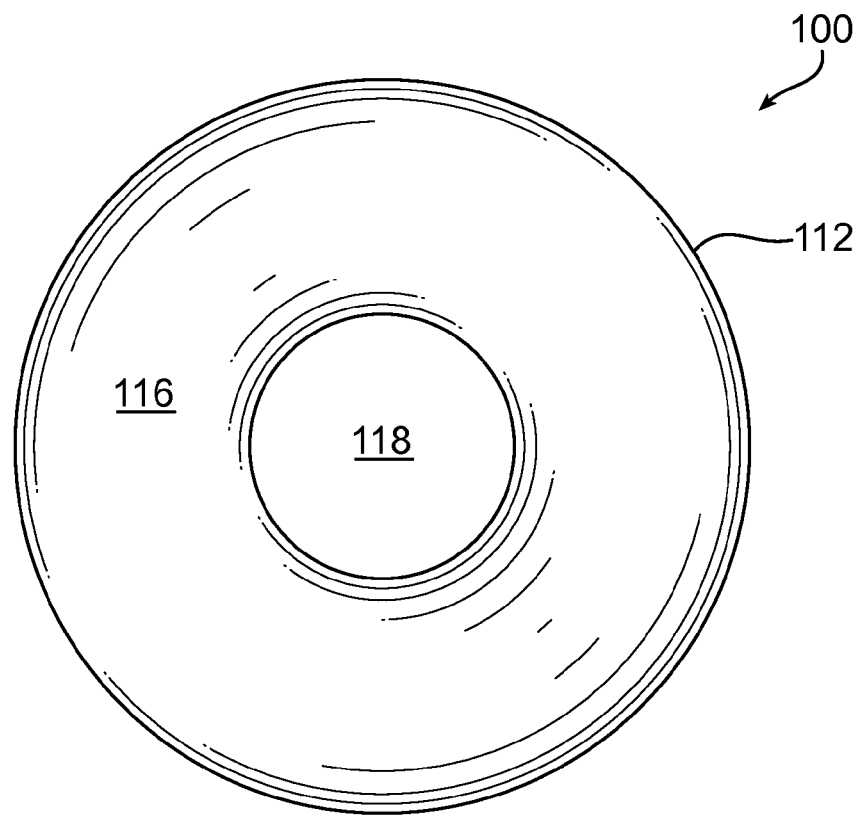
FIGS. 3A-B are views of a second platform.
Figure 3B:
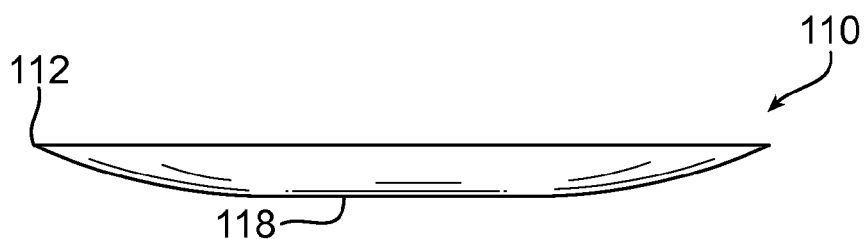

Referring now to FIGS. 3A and 3B, another example of a platform 110 is disclosed. As shown in FIG. 3A, a platform 110 may be substantially circular, and the platform aperture 118 may also be round. It will be apparent, however, that the shape of the platform 110 and the shape of the platform aperture 118 need not be the same and various combinations are possible within the scope of the present disclosure. FIG. 3B illustrates a side view of a substantially circular platform 110. As shown, the degree of downward slope may vary between adjacent the outer edge 112 and the platform aperture 118.

Figure 4A:
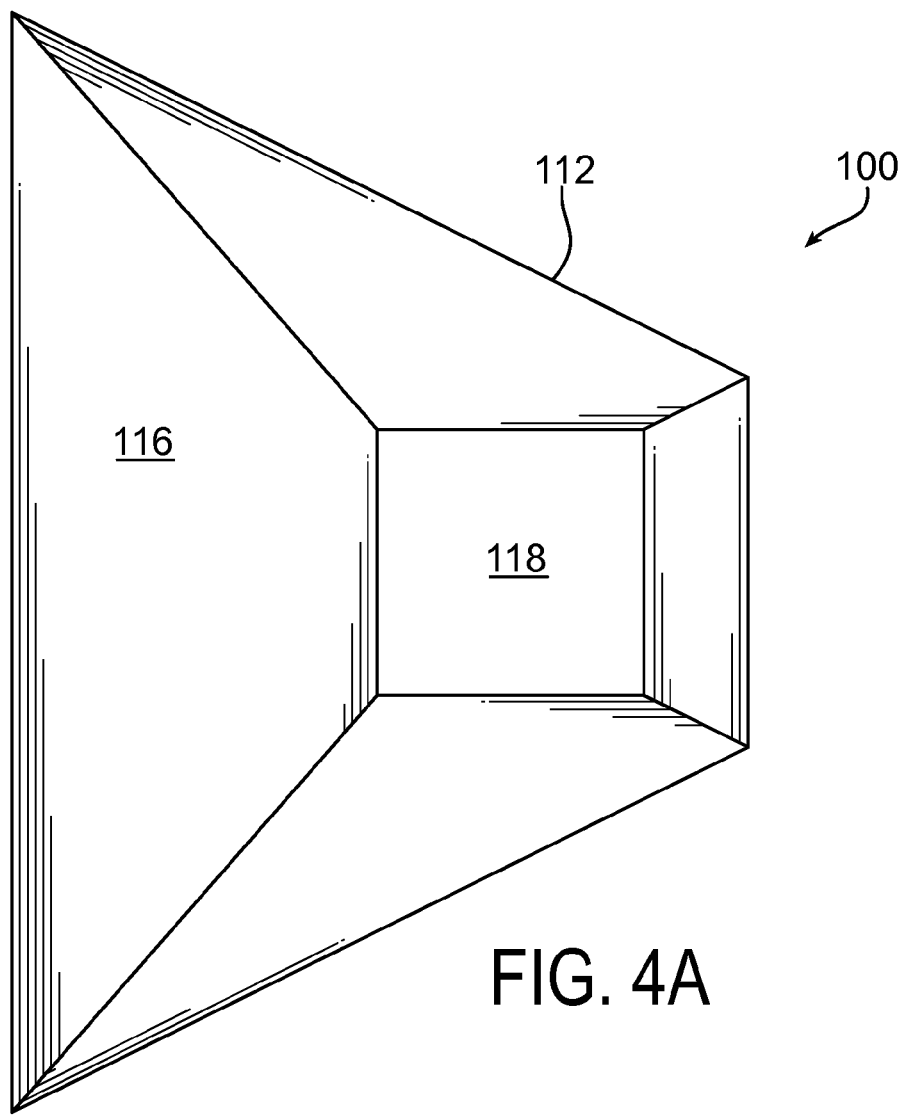
FIGS. 4A-B are views of a third platform.
Figure 4B:
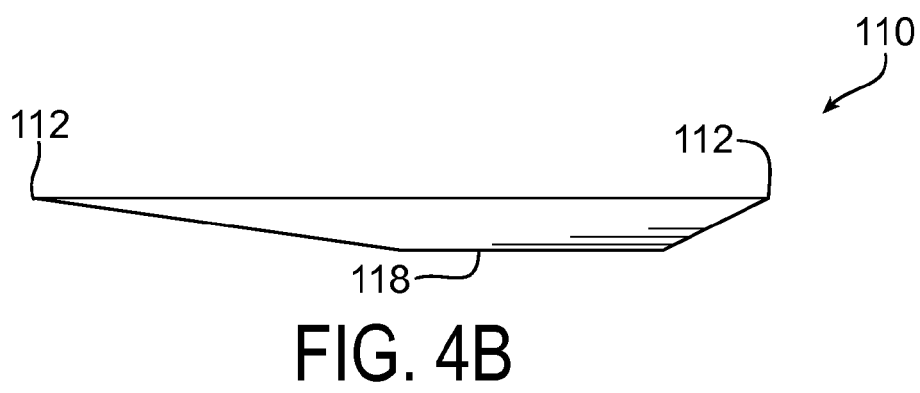

Referring now to FIGS. 4A and 4B, yet another example of a platform 110 is disclosed. As shown in FIG. 4A, the platform 110 may have a substantially trapezoidal shape. As shown more clearly in FIG. 4B, the platform 110 may have different degrees of downward slope for different portions of the platform 110. The platform 110 may be adapted to conform to the geometry of a room within a home or other structure. For example, a triangular or trapezoidal platform 110, such as illustrated in FIG. 4A, may be desired to fit into a corner of a room. By accommodating the shape of different rooms within a house, the pet environment 100 may be more conveniently located in areas encouraging interaction between the pets and people.

The top surface 116 of the platform may be painted or otherwise coated. For example, the top surface may be coated with a sealant to prevent pet waste, water, or other substances from absorbing into the platform. At least a portion of the top surface 116 of the platform may be textured to provide additional traction for the pets as they move about on the platform. The platform may have different textures over different portions of the top surface 116 as desired. The top surface 116 of the platform may be further textured to improve the transfer of pet waste to the platform aperture. Other surfaces of the platform, including the bottom surface may also be coated or textured as desired.

In yet another example, the platform 110 may also have sides (not shown) extending upwardly from the platform and extending around at least a portion of the platform. In one example, the sides may extend from the outer edge 112 of the platform 110. The sides may deter the pet from exiting the pet environment 100. Alternatively, the sides may deter other animals, such as cats or dogs, from entering the pet environment 100. The sides may extend around a portion of the platform 110, or may extend substantially around the entire perimeter of the platform 110.

The housing structure 120 may include at least one pathway 122. The pathway 122 may extend through the housing structure 120 and provide a path through the housing. The pathway 122 may also serve as a resting or sleeping area for the pet. The pathway 122 may be elongated such that the animal is oriented along the length of the pathway while passing through or resting in the pathway 122. Pets may deposit pet waste while passing through or resting in the pathway 122. Each pathway 122 may have at least one opening 124 adapted to receive pet waste. The pathway opening 124 may be a hole or aperture in bottom 134 of the tubular section 130 through which pet waste may pass.

The pathway 122 may be sloped to improve transfer of pet waste to the at least one opening 124. In one example, the pathway 122 may be sloped downward in one direction such that pet waste may travel to a pathway opening 124 located near the end of the pathway 122 at the lower end. In another example, the pathway 122 may have two openings 124 positioned substantially adjacent each end of the pathway 122 and the pathway may have separately sloped portions such that each portion may be sloped generally towards an opening.

The length of the pathway 122 may be selected to accommodate a resting animal of the type desired for the pet environment. The pathway 122 may be an elongated structured capable of orienting the resting animal in a substantially predetermined location such that the pathway openings 124 are positioned to receive pet waste generated by the resting animal. In this manner, the pet waste may pass directly through the pathway opening 124 and subsequently through the platform aperture 118 away from the pet environment. The pathway openings 124 may be vertically above the platform aperture 118 or alternatively may be above the platform 110. In another alternative, the pathway 122 may not have an opening and the pathway may be sufficiently sloped to allow pet waste to transition from the pathway to the platform. In yet another alternative, the movement of an animal onto and off of a pathway 122 may be sufficient to cause any pet waste on the pathway 122 to be moved to the platform 100 such that the pet waste may be transferred to the platform aperture 118.

Figure 5A:
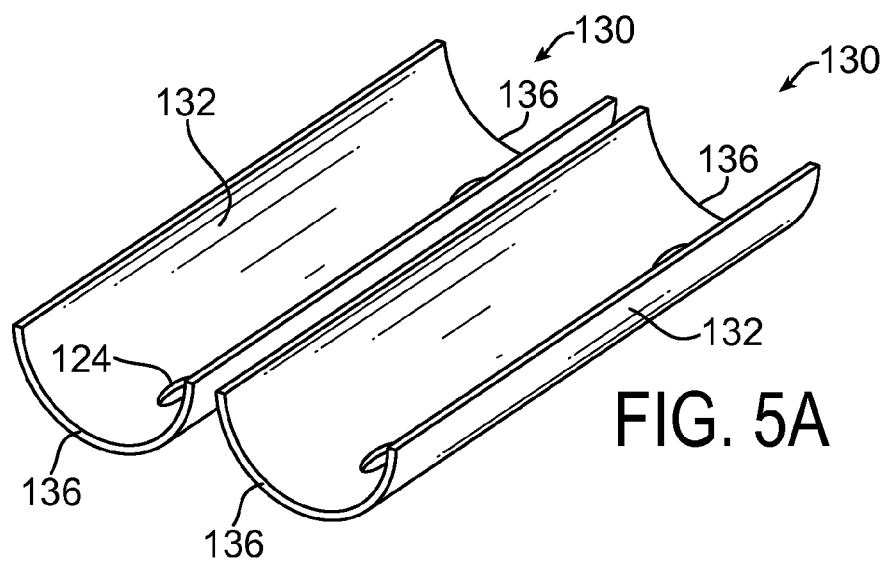
FIGS. 5A-C are views of a pathway for use with a pet environment.

In another example, the pathway 122 may be formed as a tubular section 130 as illustrated in FIG. 5A. A tubular section 130 may have sides 132 and ends 136. The length of the tubular section between ends 136 may be selected to accommodate the size of the pet desired for the pet environment 100. For example, a tubular section approximately 10 inches in length may be desired for guinea pigs. Shorter tubular sections may be desired for other animals such as hamsters or gerbils. As illustrated, the tubular section 130 may be generally rounded or U-shaped for the comfort of the animals, but other shapes are contemplated as well.

The tubular section 130 may be supported over the platform aperture 118 by a frame 146. The frame 146 may also be adapted to support the housing structure 120 above the platform aperture 118. As described herein, the housing structure 120 and pathways 122 need not be aligned with the platform aperture 118 but only supported above the top surface 116 of the platform 110 sufficient to form a gap 102 capable of allowing pet waste to pass between the housing structure and the platform.

Figure 5B:
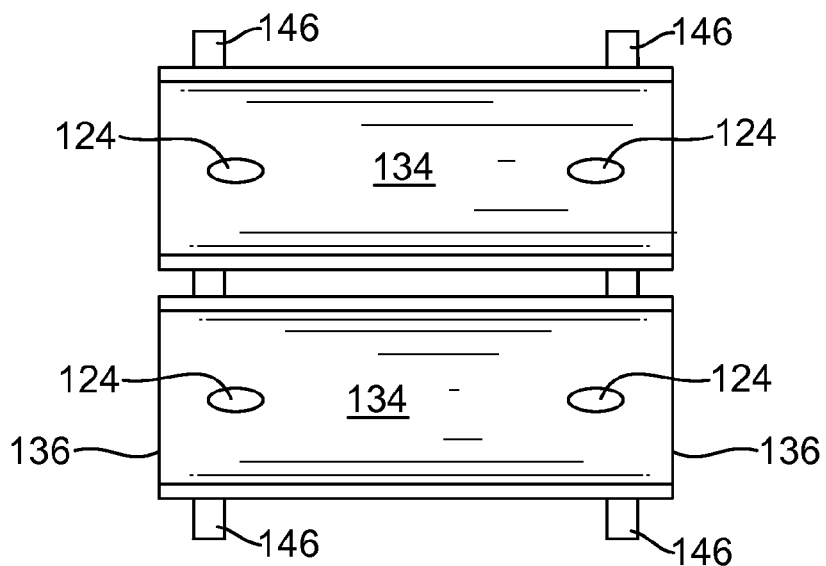
Figure 5C:
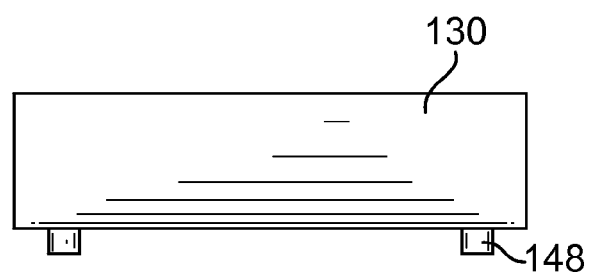

Referring to FIG. 5B, two tubular sections 130 are shown supported by a frame 146. The frame 146 may extend substantially transverse to the tubular sections 130. The pathway openings 124 may be positioned in the bottom 134 of the tubular section 130 substantially adjacent to the ends 136 of the tubular section 130. The frame 146 may have legs 148 extending downwardly from the frame 146 adapted to contact the platform 110 and support the frame 146 and the tubular section 130. In this manner, the tubular section 130 and the frame 146 may be formed independent of other portions of the housing structure. For example, the at least one pathway 122 and the frame 146 may be formed as a unitary component. In one example, two pathways, including pathway openings, and a frame structure with four legs may be formed from a singled piece of molded plastic. Such a design may be preferred to facilitate removal from the pet environment 100 and cleaning of the pathway 122.

Figure 6A:
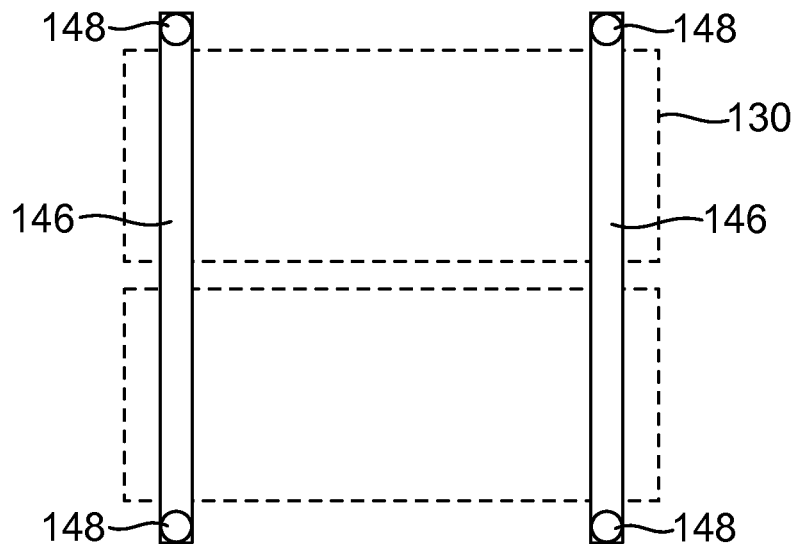
FIGS. 6A-B are top views of frames.
Figure 6B:
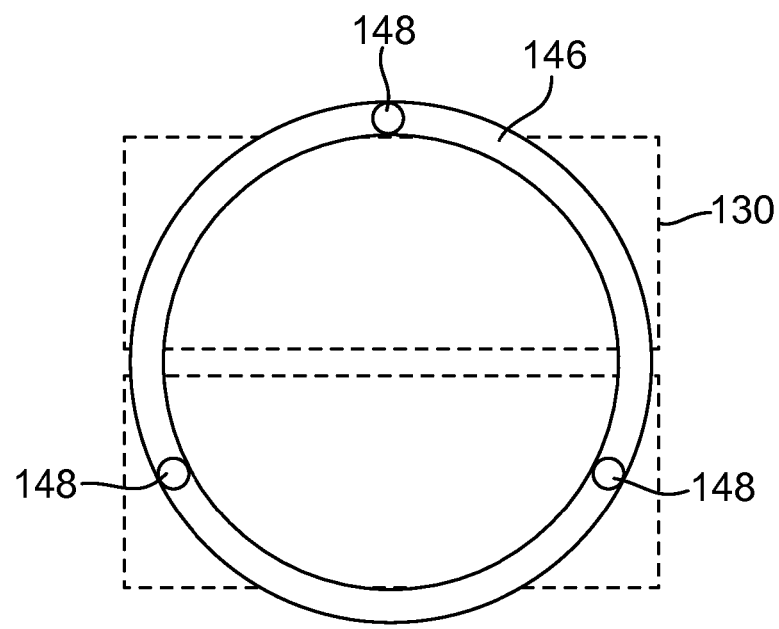

Referring now to FIGS. 6A and 6B, additional frame designs are illustrated. As shown in FIG. 6A, the frame 146 may comprise two substantially parallel supports extending traverse to the supported tubular sections 130. The frame 146 may include four legs 148 adapted to contact the top surface 116 of the platform 110. In another alternative, the frame 146 may be substantially circular, as shown in FIG. 6B. As illustrated, two tubular sections 130 forming pathways 122 are supported by the substantially circular frame 146. In this example, the frame 146 may have three legs 148 positioned to contact the platform 110 and provide stability for the housing structure 120. In various examples, the frame 146 may be adapted to contact the top surface 116 of the platform 110 near the platform aperture 118, or substantially distant from the platform aperture 118. In one example, the frame 146 may extend to and contact the outer edge 112 of the platform 110.

The legs 148 of the frame 146 may rest on the top surface 116 of the platform 110. Alternatively, the legs 148 may engage notches or operatively connect with apertures in the platform 110. The legs 148 of the frame 146 may be adapted to provide a substantially continuous surface from the platform to reduce edges or discontinuities that may impede the movement of pet waste from the platform 110 down to the platform aperture 118. In one example, the bottoms of the legs 148 may be adapted to conform to the degree of downward slope of the top surface 116 of the platform 110.

Figure 7:
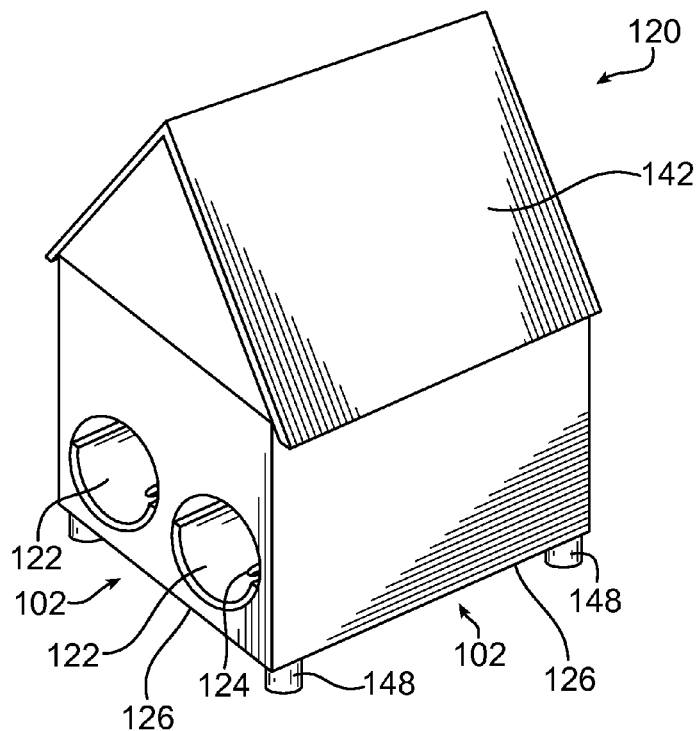
FIG. 7 is a perspective view of a housing structure.

Referring now to FIG. 7, an example housing structure 120 is illustrated. The housing structure 120 may including pathways 122 with pathway openings 124 as previously discussed. The housing structure 120 may be supported upon a frame having legs 148 adapted to contact the top surface 116 of the platform 110. The housing structure 120 may be supported above the platform 110 to form a gap 102 between the bottom portion 126 of the housing structure 120 and the top surface 116 of the platform 110. The gap 102 may extend along or around at least a portion of the platform aperture 118 to receive pet waste from the platform 110. In one example, the gap 102 may extend entirely around the perimeter of the housing structure 120.

The housing structure 120 may also comprise a housing roof 142 and housing sides 144. The housing roof 142 and housing sides 144 may form a removable cover adapted to be positioned over the at least one pathway. As such, the pet environment 100 may be assembled by assembling one or more pathways 122 to a frame 146, positioning the assembled pathways 122 and frame 146 over the pathway aperture 118, and finally positioning a removable cover over the pathways 122 to form the housing structure 120. Similarly, the cover may be removed to access the pathways for cleaning or maintenance.

The pet waste generated by pets in the pet environment 100 may be transferred through the platform aperture 118 and away from the pet living area. As a consequence, bedding materials, such as wood chips, straw, litter, and other similar materials, may not be required and the cost and cleaning required for bedding material may be reduced or eliminated. Bedding material may be utilized if desired or may be limited to a confined area within the pet environment.

Figure 8:
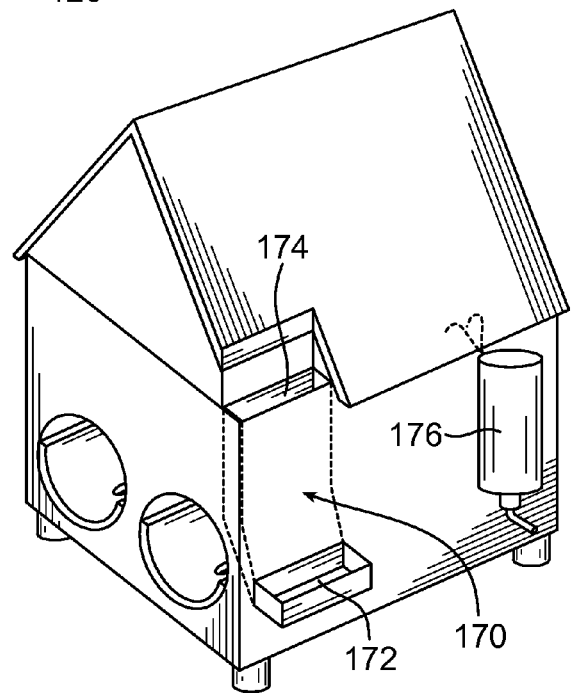
FIG. 8 is a perspective view of a second housing structure.
Figure 9:
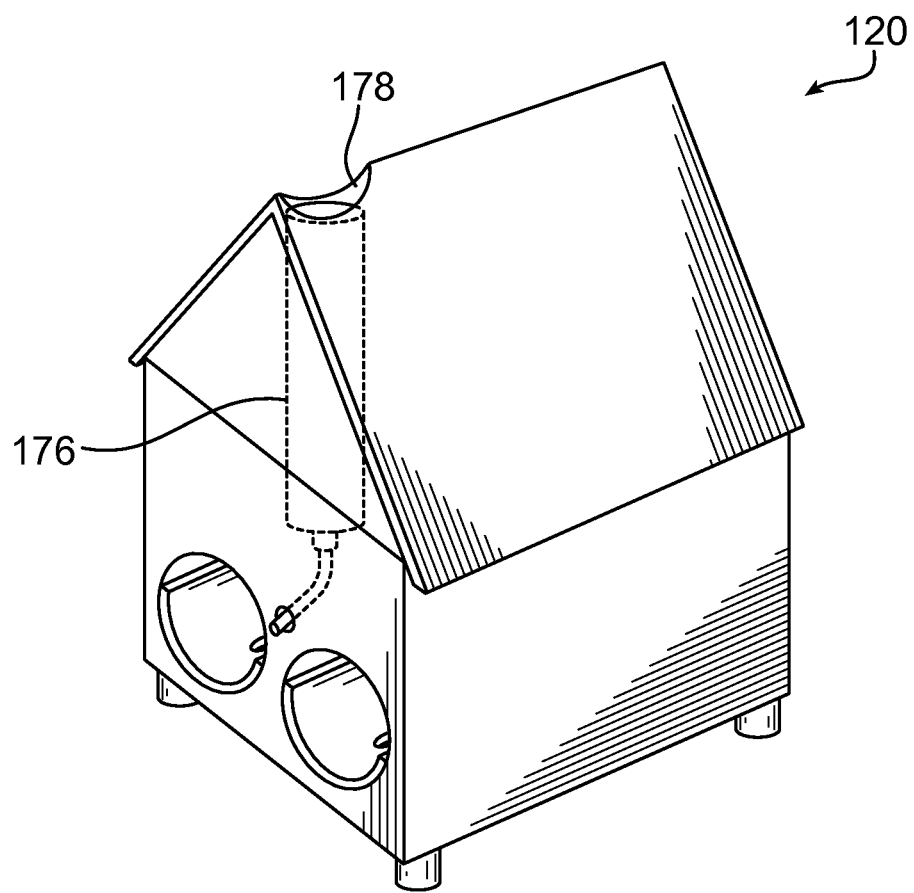
FIG. 9 is a perspective view of a third housing structure.

Referring to FIG. 8, another housing structure 120 for use with the pet environment 100 is disclosed. As illustrated, the housing structure 120 may be adapted to support a food dispenser 170. The food dispenser 170 may be raised above the top surface 116 of the platform 110 thereby reducing the risk of pet waste entering the food dispensing area. The housing structure 120 may have a food slot 174 adapted for filling the food dispenser and a food tray 172 from which the pets may access the food. The housing structure 120 may also support a water dispenser 176. In one example, a housing structure 120 may include a chimney portion configured to support a water dispenser 176. Referring to FIG. 9, the housings housing structure 120 may have a water dispenser opening 178 for supporting the waster dispenser 176 within the housing structure 120.

The housing structure 120 may be a traditional house type structure as illustrated, however, other structures are contemplated. The housing structure 120 may be formed in various decorative designs, for example, designs to appeal to children or to integrate with decorative themes in a house. As such the pet environment 100 may be more easily integrated into the living areas of a house thereby promoting interaction between the pets and the human caregivers. As previously described, no specific configuration is required for the housing structure 120 and the housing structure may be incorporated with the pathway 122.

Figure 10:
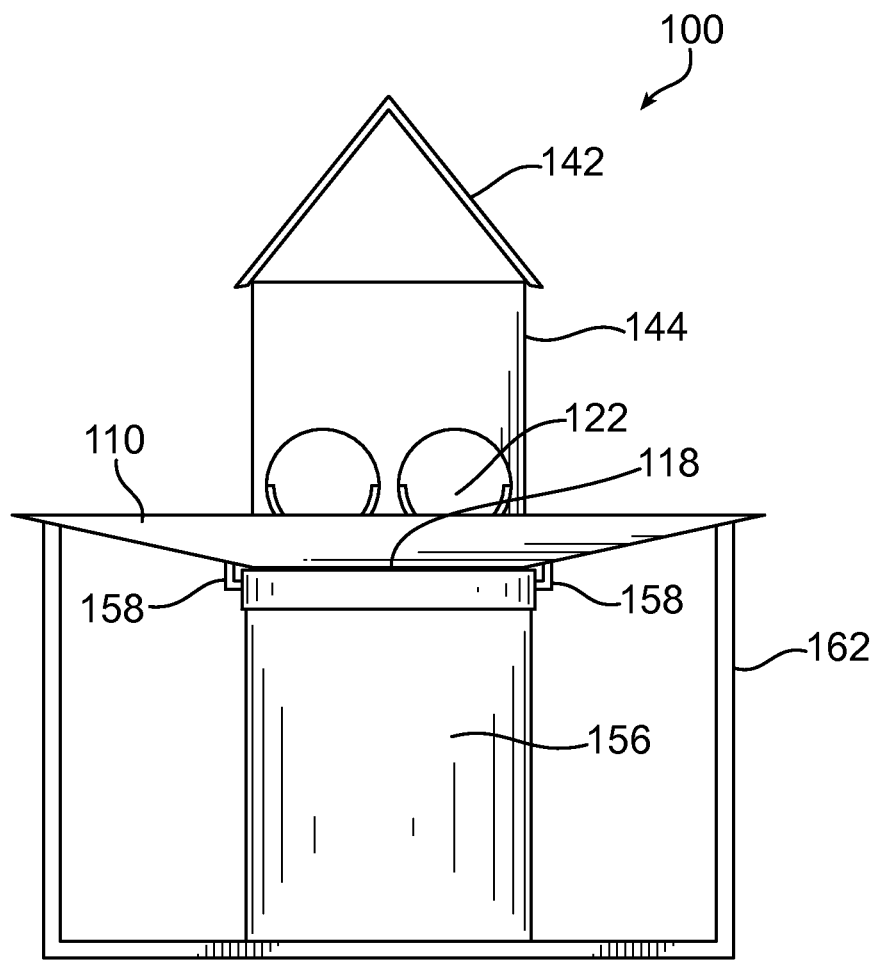
FIG. 10 is a cross-sectional side view of another pet environment.

The pet environment 100 may be supported by a support structure 160. The support structure 160 may support the platform 110 and housing structure 120, and may also support a container 156. In one example, the support structure 160 may include a flexible frame 162 as illustrated in FIG. 10. The flexible frame 162 may be formed from rods, pipes, or other suitable materials. The flexible frame 162 may be adapted to produce a vibratory effect in response to the movement of an animal in the pet environment 100. The vibratory effect may be a slight movement or shaking of the pet environment, and specifically the platform 110. The vibratory effect may further facilitate the movement of pet waste along the platform 110 down through the platform aperture 118.

Also illustrated, the container 156 may be supported beneath the platform 110 by container supports, such as brackets 158. The brackets 158 may be adapted to releaseably secure a container below the platform aperture 118. The brackets 158 may maintain the container 156 in alignment with the platform aperture 118 such that pet waste successfully transitions through the platform aperture into the container. The container 156 may be a plastic container such as a standard waste bin, or other similar waste collection device. The size of the container 156 may be selected depending upon the number and type of animals to be housed in the pet environment. In one example, the platform 110 may be placed on and rest on top of the container 156. In this fashion, the container 156 may be adapted to function as a support structure 160 and no other support structure may be necessary.

Figure 11:
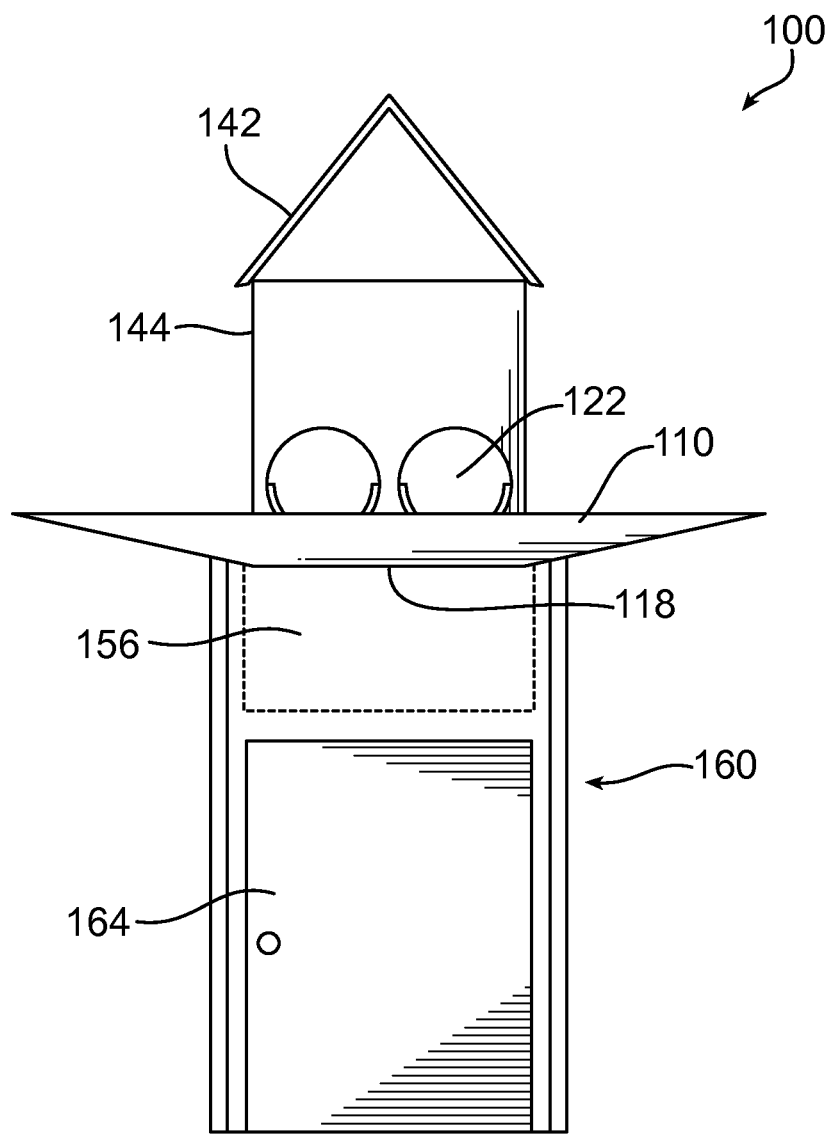
FIG. 11 is a cross-sectional side view of yet another pet environment.

In another example, the pet environment 100 may be have a support structure 160 including a cabinet 164 or other storage unit. As shown in FIG. 11, the support structure 160 may provide storage for pet supplies or other items desired to be stored. The support structure 160 may also provide a space for a container 156. The space for the container 156 may be open or closed as desired. In one example, the space for the container 156 may also be closed thereby improving the aesthetics of the pet environment and facilitating incorporation of the pet environment into a house.

In an additional configuration, two or more pet environments 100 may be joined to form a combined pet environment. The combined pet environment may include multiple housing structures and pathways with an increased usable area for the pets. The platforms 110 of the individual pet environments 100 may be adapted to operatively engage each other to reduce separation of the platforms 110. For example, the platforms 110 may include clips or interlocking tabs adapted to maintain contact between the outer edges 112 of adjacent platforms 110. A combined pet environment may thus provide an ability to increase the capacity or size of a pet environment or adapt the pet environment to variable numbers of animals as desired.

In yet another example, a pet environment 100 may include a platform 110 having an outer edge 112 and a platform aperture 118, where the platform slopes downward from adjacent the outer edge to the platform aperture. The pet environment 100 may also include a housing structure 120 positioned above the platform aperture having at least one tubular section 130 in the housing structure, the tubular section having at least one opening 124 adapted to receive pet waste and being sloped to improve transfer of pet waste to the at least one opening. The housing structure 120 may also have a removable cover adapted to be positioned over the at least one tubular section, and a frame 146 adapted to support the housing structure above the platform aperture. The pet environment 100 may also include a gap between the platform and the housing structure extending along at least a portion of the platform aperture to receive pet waste from the platform, a container positioned below the platform aperture adapted to receive pet waste, and a support structure beneath the platform adapted to support the platform and the housing structure, where the support structure is flexible and adapted to produce a vibratory effect in response to movement of an animal.

In yet another example, the pet environment 100 may include a platform 110 having an outer edge 112 and a platform aperture 118, where the platform slopes downward from adjacent the outer edge toward the platform aperture. The pet environment 100 may also include a housing structure having at least one pathway in the housing structure, as described in greater detail above. The housing structure may be positioned fully or partially above the platform. The pathway may have at least one opening adapted to receive pet waste and the opening may be positioned above the platform such that pet waste passing through the opening may fall onto the platform below. The pet environment 100 may also have a second structure (not shown) positioned above the platform aperture. The second structure may be a food dispenser, a water dispenser such as a dish, or any other structure capable of spanning the platform aperture. In one example, the second structure is a cap adapted to prevent an animal from falling or slipping into or through the platform aperture. In another example, the second structure may be a grate adapted to allow pet waste to pass through and extending across the platform aperture. The second structure may be positioned extending substantially across the platform aperture in a same or similar manner as the housing structure previously described. The pet environment may also have a gap between the platform and the second structure extending around at least a portion of the platform aperture to receive pet waste from the platform. The gap may be large enough to permit pet waste to pass through, but may be small enough to prevent a pet from passing through or becoming caught in the gap.

While certain embodiments have been described, it must be understood that various changes may be made and equivalents may be substituted without departing from the spirit or scope. In addition, many modifications may be made to adapt a particular situation or material to the teachings of the disclosure without departing from its spirit or scope.

What is claimed is:

1. A pet environment comprising:
a living area including
a platform having a sloped top surface configured to support a pet wherein the pet is one of a guinea pig, rabbit, hamster, gerbil, or mouse , an outer edge and a platform aperture adapted to receive pet waste, at least a substantial portion of the platform top surface sloping downward at between 2° and 10° from adjacent the outer edge to the platform aperture;
a housing structure positioned with the platform aperture having at least one pathway in the housing structure;
a gap between the platform and the housing structure extending along at least a portion of the platform aperture configured to receive pet waste from the platform; and
a support structure beneath the platform adapted to support the platform and the housing structure, wherein the support structure is flexible and adapted to produce a vibratory effect in response to movement of an animal.

2. The pet environment of claim 1 further comprising a container for collecting pet waste positioned below the platform aperture.

3. The pet environment of claim 1, where the platform is substantially concave.

4. The pet environment of claim 1, where the platform is formed from molded plastic.

5. The pet environment of claim 1, where at least a portion of the top surface of the platform is textured.

6. The pet environment of claim 1, the platform having sides extending upwardly around at least a portion of the platform.

7. The pet environment of claim 1, the housing structure further having a frame adapted to support the housing structure above the platform aperture, wherein the frame contacts the top surface of the platform adjacent the platform aperture.

8. The pet environment of claim 7, where the at least one pathway and the frame are formed as a unitary component.

9. The pet environment of claim 1, the housing structure further having a removable cover adapted to be positioned over the at least one pathway.

10. The pet environment of claim 1, where the housing structure is adapted to support a food dispenser.

11. The pet environment of claim 1, where the housing structure is adapted to support a water dispenser.

12. The pet environment of claim 1, where the at least one pathway includes at least one opening adapted to receive pet waste and is sloped to improve transfer of pet waste to the at least one opening.

13. The pet environment of claim 1, where the at least one pathway is adapted to support a resting animal.

14. The pet environment of claim 1, where the at least one pathway comprises a tubular section extending through the housing structure.

15. The pet environment of claim 1, where the support structure is further adapted to support a container for collecting pet waste positioned below the aperture.

16. A pet environment comprising:
   a living area including
      a platform having a top surface configured to support a pet wherein the pet is one of a guinea pig, rabbit, hamster, gerbil, or mouse, an outer edge and a platform aperture, the platform surface sloping downward from adjacent the outer edge to the platform aperture; and
      a housing structure positioned at least partially above the platform having at least one pathway in the housing structure, the pathway having at least one opening positioned above the platform adapted to receive pet waste;
      wherein the platform aperture has an area equal to or less than 10% of a total area of the platform; and
      a support structure beneath the platform adapted to support the platform and the housing structure, wherein the support structure is flexible and adapted to produce a vibratory effect in response to movement of an animal.

17. The pet environment of claim 16 further comprising:
   a gap between the platform and the second structure extending along at least a portion of the platform aperture to receive pet waste from the platform.

18. A pet environment comprising:
   a living area including
      a platform having a sloped top surface configured to support a pet wherein the pet is one of a guinea pig, rabbit, hamster, gerbil, or mouse, an outer edge and a platform aperture, the platform top surface sloping downward at between 2° and 10° from adjacent the outer edge to the platform aperture;
      a housing structure positioned above the platform aperture having:
         at least one tubular section in the housing structure, the tubular section having at least one opening adapted to receive pet waste and being sloped to improve transfer of pet waste to the at least one opening;
         a removable cover adapted to be positioned over the at least one tubular section;
         a frame contacting the top surface of the platform adjacent to the platform aperture adapted to support the housing structure above the platform aperture forming a gap between the platform and the housing structure extending along at least a portion of the platform aperture to receive pet waste from the platform; and
   a container positioned below the platform aperture adapted to receive pet waste; and
   a support structure beneath the platform adapted to support the platform and the housing structure, where the support structure is flexible and adapted to produce a vibratory effect in response to movement of an animal.

* * * * *